United States Patent Office 2,999,077
Patented Sept. 5, 1961

2,999,077
METHOD OF PREPARING ORGANOPOLY-SILOXANE ELASTOMERS
Siegfried Nitzsche and Manfred Wick, Burghausen, Germany, assignors to Wacker-Chemie G.m.b.H., Munich, Bavaria, Germany
No Drawing. Filed Apr. 9, 1958, Ser. No. 727,276
Claims priority, application Germany Apr. 10, 1957
6 Claims. (Cl. 260—18)

This invention relates to an organopolysiloxane composition which will vulcanize to an elastomeric state at room temperature in a short period of time.

Silicone rubber, based on organosiloxane polymers, is a well-known and widely used material. Many systems have been proposed and successfully employed to secure vulcanization of silicone rubber stocks. The use of organic peroxides and halogenated organic peroxides and heat is probably the most familiar and widely used means for securing the desired vulcanization. Other systems for securing vulcanization of silicone rubber include the use of mixtures of hydrocarbonoxy silicates and carboxylic acid salts of certain metals, with or without heat (United States application Serial No. 632,630, filed January 7, 1957), now U.S. Patent No. 2,927,907; the use of a mixture of a substantially nonvolatile alkylpolysilicate and an aliphatic amine (United States application Serial No. 538,801, filed October 5, 1955), now U.S. Patent No. 2,833,742; the use of certain sulfur compounds (United States application 536,088, filed September 22, 1955), now U.S. Patent No. 2,909,756; the use of sulfur with or without sulfur vulcanization accelerators in conjunction with alkenyl substituted siloxanes (United States application Serial No. 451,057, filed August 19, 1954); the use of polyamines with certain halogen containing organosiloxanes (United States Patent No. 2,728,743, issued December 27, 1955); and the use of certain polyfunctional organosilicon compounds and catalytic agents such as metal soaps, metal chelates, metal salts of thiols and dithiocarbamic acids, organometallic compounds, organic bases, and acid catalysts in conjunction with an alkoxy, aryloxy or hydroxy endblocked diorganosiloxane, with or without heat (United States application Serial No. 602,081, filed August 3, 1956).

Many of the proposed vulcanization systems require the use of heat and thus certain applications for the silicone rubber product cannot make use of such systems. For example, the use of heat to secure vulcanization eliminates systems employing organic peroxides as vulcanizing agents from consideration in such applications as taking anatomical impressions of human bodies, especially dental impressions for preparing false teeth. Other applications where room temperature vulcanizing silicone rubber stocks are desirable will be apparent to those skilled in the art.

The presently known room temperature vulcanizing silicone rubber stocks suffer from various deficiencies. For example, the system set forth in application Serial No. 602,081, supra, employs mixtures of dimethylpolysiloxanes and methyl hydrogen polysiloxanes together with a silica filler and dibutyl tin dilaurate as a catalyst. Deep sections of such combinations are, however, difficult to vulcanize to a void free rubber because hydrogen is evolved from the methyl hydrogen siloxane causing bubbles on the surface as well as in the interior of the vulcanized rubber. Thus, for void free thick sections of rubber having smooth non-bubbled surfaces such a system has been found to be impractical.

It is an object of this invention to prepare a silicone rubber stock capable of vulcanizing at room temperature. Another object is a stock which can be vulcanizing in thick section at room temperature without undue bubbling and avoiding the occurrence of voids in the vulcanized product. A further object is a silicone rubber stock suitable for use in taking dental impressions. Further objects and advantages of this invention are apparent from or are detailed in the disclosure and claims which follow.

The compositions of this invention consist essentially of (1) an organopolysiloxane copolymer of diorganosiloxane units and 0.1 to 2.0 mol percent inclusive of methylhydrogensiloxane units, (2) a filler and (3) an organic tin compound as a curing catalyst. Such compositions will vulcanize at room temperature to void free silicone rubber.

The organopolysiloxane copolymers operative herein consist essentially of $R_2SiO$ units and $RHSiO$ units, wherein each R can be an alkyl radical such as methyl, butyl and octadecyl; an aryl radical such as phenyl, diphenyl, and anthracyl; a halogenated alkyl radical such as trichloromethyl, perfluoroethyl, bromopropyl, chlorofluoromethyl, dichlorotrifluoroethyl and so forth; or a halogenated aryl radical such as pentachlorophenyl, perfluorophenyl and chlorofluorophenyls.

The above organosiloxane copolymers contain .1 to 2 mol percent of units of the formula $RHSiO$, the balance of the copolymer being essentially diorganosiloxane units. Minor amounts of $SiO_2$ units, $R'SiO_{3/2}$ units and $R'_3SiO_{1/2}$ units, where R' is a hydrogen atom, alkyl radical or aryl radical, can be tolerated. The average ratio of organic radicals and hydrogen atoms attached to silicon to the silicon atoms present should be in the range of 1.9/1 to 2.1/1 and preferably from 1.99/1 to 2.01/1.

The fillers operative herein can be any of the wide variety of fillers known and used in silicone rubber. Such materials as metal oxides such as $TiO_2$, magnesium oxide, zinc oxide, ferric oxide, chromic oxide, zirconium oxide and aluminum oxide, siliceous materials such as fume silicas, silica aerogels, diatomaceous earth, crushed quartz, glass fibers, clays and asbestos; carbon black; organic materials such as cork, cotton and synthetic fibers. The operative fillers also include those inorganic materials, particularly silicas, which have organosilyl groups such as trimethylsilyl groups or alkoxy groups attached to the surface.

The catalysts employed herein to secure vulcanization or cure of the siloxanes are organic tin compounds such as tin ricinoleate and dibutyl tin dilaurate in addition to dialkyl tin diacylates in general.

The compositions of this invention are employed by mixing the various ingredients together in any desired order. It is advisable to admix the siloxane polymer and filler together before addition of the catalyst is accomplished because the vulcanization starts when the catalyst is added. The material is merely molded, extruded or otherwise adapted to its ultimate shape and then is allowed to vulcanize or cure to a finished, void free silicone rubber product.

The silicone rubber prepared according to the teaching of this invention can be used for any of the applications heretofore proposed for room temperature vulcanizing silicone rubber. Of particular interest is the use of the stocks of this invention as dental impression material for use in the preparation of false teeth and orthodontia. It is also noteworthy that silicone rubber prepared according to this invention exhibits better adherence to metal than is generally found in silicone rubber stocks.

The following examples are included to aid those skilled in the art to understand and practice this invention. All parts and percentages expressed in the examples are based on weight unless otherwise indicated.

Example 1

A copolymer of 99.2 mol percent dimethylsiloxane units and 0.8 mol percent methylhydrogensiloxane was prepared by cohydrolysis and condensation of a mixture of the corresponding chlorosilanes. The copolymer was washed free of acid and further polymerized to a fluid having a viscosity of 30,000 cs. at 25° C. 100 parts of the copolymer and 100 parts of finely ground quartz powder were thoroughly milled together and 3.0 parts of dibutyl tin dilaurate were admixed therewith. The mixture vulcanized at room temperature within 5 minutes to a void free silicone rubber.

Example 2

A silicone oil was prepared by cohydrolysis of 98.2 mol percent dimethyldichlorosilane and 1.8 mol percent methyldichlorosilane. The product was washed free of acid and subsequently polymerized to a fluid having a viscosity of 12,000 cs. 100 parts of the thus obtained copolymer and 20 parts of fumed silica were thoroughly mixed on a three-rolls-mill and 2.3 parts dioctyltin diacetate admixed on the mill. The mixture vulcanized at room temperature within 4 minutes to a void free silicone rubber.

Example 3

A silicone rubber paste was prepared from the copolymer according to Example 2 by the addition of 50 parts calcium carbonate per 100 parts of copolymer. 5 parts of lead octoate were admixed to this mixture. The thus obtained mixture vulcanized within 8 minutes at room temperature to a void free mass which showed an excellent adhesiveness on metals and plastic materials.

That which is claimed is:

1. A composition consisting essentially of (1) an organopolysiloxane copolymer of diorganosiloxane units of the formula $R_2SiO$ where each R is an organic radical selected from the group consisting of alkyl radicals, aryl radicals, halogenated alkyl radicals and halogenated aryl radicals, and 0.1 to 2.0 mol percent of methylhydrogensiloxane units, (2) a filler and (3) an organic tin compound selected from the group consisting of tin ricinoleate, dibutyl tin dilaurate and dioctyl tin diacetate.

2. The composition of claim 1 wherein the filler is a silica.

3. The composition of claim 1 wherein the filler is a fume silica.

4. A composition consisting essentially of (1) an organopolysiloxane copolymer of diorganosiloxane units of the formula $R_2SiO$ where each R is an organic radical selected from the group consisting of alkyl radicals, aryl radicals, halogenated alkyl radicals and halogenated aryl radicals, and 0.1 to 2.0 mol percent of methylhydrogensiloxane units, (2) a filler and (3) a dialkyl tin diacylate as curing catalyst.

5. The composition of claim 4 wherein the filler is a silica.

6. The composition of claim 4 wherein the filler is a fume silica.

References Cited in the file of this patent

UNITED STATES PATENTS

| Number | Name | Date |
|---|---|---|
| 2,448,556 | Sprung et al. | Sept. 7, 1948 |
| 2,588,393 | Kauppi | Mar. 11, 1952 |
| 2,814,601 | Currie et al. | Nov. 26, 1957 |
| 2,843,555 | Berridge | July 15, 1958 |
| 2,881,146 | Remer et al. | Apr. 7, 1959 |

FOREIGN PATENTS

| 787,175 | Great Britain | Dec. 4, 1957 |
|---|---|---|